US009142337B2

(12) United States Patent
Nelson

(10) Patent No.: US 9,142,337 B2
(45) Date of Patent: Sep. 22, 2015

(54) ELECTRIC FENCE INSULATOR ASSEMBLY

(71) Applicant: Steven Michael Nelson, Iron River, MI (US)

(72) Inventor: Steven Michael Nelson, Iron River, MI (US)

( * ) Notice: Subject to any disclaimer, the term of this patent is extended or adjusted under 35 U.S.C. 154(b) by 283 days.

(21) Appl. No.: 13/872,127

(22) Filed: Apr. 28, 2013

(65) Prior Publication Data

US 2014/0318828 A1 Oct. 30, 2014

(51) Int. Cl.
*H01B 17/14* (2006.01)
*E04H 17/10* (2006.01)
*A01K 3/00* (2006.01)

(52) U.S. Cl.
CPC .............. *H01B 17/145* (2013.01); *A01K 3/005* (2013.01); *E04H 17/10* (2013.01)

(58) Field of Classification Search
CPC ...... A01K 3/005; H01B 17/16; H01B 17/145; E04H 17/10
USPC ........... 174/135, 137 R, 138 R, 163 R, 163 F, 174/158 F, 160, 161 F, 161 R, 162, 168, 173, 174/174; 256/10, 32
See application file for complete search history.

(56) References Cited

U.S. PATENT DOCUMENTS 4,077,611 A 3/1978 Wilson
4,559,413 A * 12/1985 Logstrup et al. .......... 174/163 R
4,771,137 A * 9/1988 Thompson ................. 174/163 F
5,412,158 A 5/1995 Yearwood
6,583,363 B1 6/2003 Wilson, Jr.
6,619,627 B2 9/2003 Salisbury et al.
7,216,852 B2 5/2007 Gravelle
7,511,227 B2 3/2009 Ritchie
7,626,119 B2 * 12/2009 Axland et al. .................. 174/53
2002/0125466 A1 9/2002 Reid
2014/0311829 A1 * 10/2014 Priest et al. ................... 182/187

* cited by examiner

*Primary Examiner* — Jenny L Wagner
*Assistant Examiner* — Jessey R Ervin
(74) *Attorney, Agent, or Firm* — Steven H. Greenfield; Greenfield Invention and Patent Consulting Inc.

(57) ABSTRACT

An electric fence insulator assembly configured for attaching to tree trunks, pipes, posts and t-posts of various size, shape and materials is disclosed. The electric fence insulator assembly comprises two panels disposed at an obtuse angle and connected by a connecting member containing a clamp. Attached to the rear of each panel is a cord gripping member. The electric fence insulator assembly is fitted between the two panels and an elasticized cord wraps around the tree trunk, pipe or post, then wedged into the first gripping member at one end and wedged into the second gripping member at its other end. This configuration minimizes the contact area of the electric fence insulator assembly with the tree trunk. The shape of the insulator is designed to maximize stability and provide a secure attachment to trees, pipes and posts. A stretchable cord allows for expansion and adjustability as the tree grows.

12 Claims, 17 Drawing Sheets

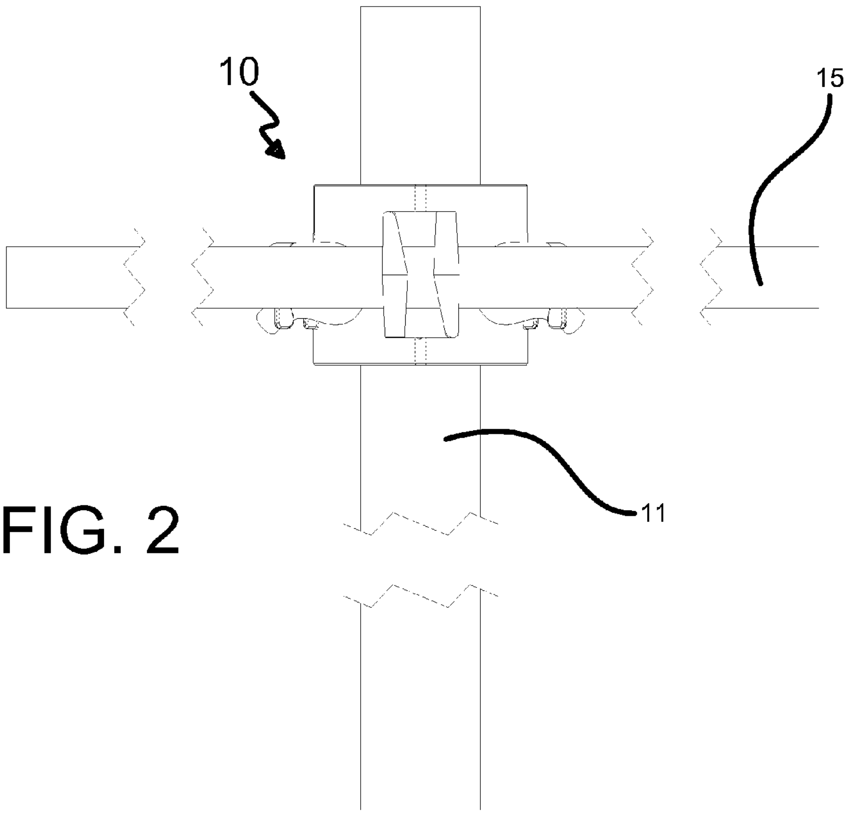
FIG. 2
FIG. 3
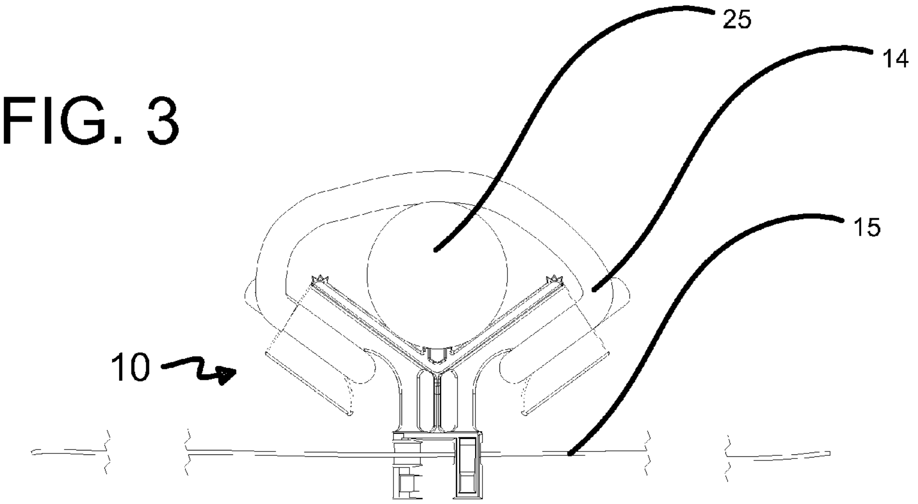

ELECTRIC FENCE INSULATOR ASSEMBLY

RELATED APPLICATIONS

This application claims priority from provisional application No. 61/648,195 filed on May 17, 2012.

FIELD OF THE INVENTION

The present invention is related to electric fences and specifically to insulators used in electric fences. More specifically, the present invention relates to an insulator having a modified shape configured for fastening to tree trunks, poles and posts of various sizes, shapes and materials.

BACKGROUND OF THE INVENTION

Prior art references disclose a variety of electric fence insulators.

U.S. Pat. No. 4,077,611 discloses a fence wire mount and insulator device adapted for mounting on a metal fence post of T-shaped cross section in which wire is supported in spaced relationship relative to the fence post by a bracket member which engages the fence post and is shaped to accommodate a variety of configurations and dimensions.

U.S. Pat. No. 5,412,158 relates to electric wire insulators for connection with a T-shaped corner fence post formed by a generally U-shaped rigid mounting member having parallel legs transversely spanning a T-shaped post.

U.S. Pat. No. 6,583,363 is for a unitary insulator of plastic material that supports an electrified conductor wire in a horizontal position when the insulator is fastened to either a vertical post or is rotated slightly and is fastened to the diagonally extending wires of a chain link fence.

In U.S. Pat. No. 7,216,852, a support bracket is adapted to secure wire fence elements to posts having T-shaped cross-sections with a leg and two cross-arms. The bracket includes a first slot adapted and constructed to receive a cross-arm of a fence post, and a second slot adapted and constructed to receive a cross-arm of the fence post, the second slot being generally aligned with the first slot. A third slot is adapted and constructed to receive a leg of the fence post, and is generally perpendicular to the first and second slots.

U.S. Pat. No. 7,511,227 teaches a connector adapted to engage with a support member, preferably being formed with a T-post configuration which provides a plurality of divergent arms. The connector can include a main body adapted to define a central recess and two or more clamping surfaces which extend from the main body. These clamping surfaces are configured to engage with a divergent arm of the support member.

The t-post fence bracket described in U.S. Pat. No. 6,619,627 provides a simple and effective means of securing a variety of items by use of u-hooks, plates or brackets to a widely used metal t-post without the use of tools.

US publication 20020125466 provides for a fence support device and method for constructing a fence support which comprises a sleeve for fitting over a supporting member such as a rod extending vertically from a concrete base.

The electric fence insulators disclosed in the prior art references do not seem to configure for attaching to tree trunks in a way that minimizes the damage that may occur to the trees from prolonged contact with clamping arms and other attaching means to the trees. Also, the designs of the prior art references do not seem to configure for attaching to pipes and posts of various sizes, shapes and materials.

SUMMARY OF THE PRESENT INVENTION

In one aspect of the present invention, an electric fence insulator assembly configured to provide for stability in attachment to a variety of post materials and surfaces and for attaching to a tree in a manner as to prevent damage to a growing tree, the electric fence insulator assembly comprises: a first lateral panel having an inner end and an outer end and a second lateral panel having an inner end and an outer end, the first panel inner end being attached to a first side of a connecting member, the second panel inner end being attached to a second side of the connecting member; a first cord gripping member attached to a rear side of the first lateral panel, the first cord gripping member containing a vertical panel and a horizontal panel, the horizontal panel of the first cord gripping member containing an arcuate shaped cutout, the vertical panel of the first cord gripping member containing an indent; a second cord gripping member attached to a rear side of the second lateral panel, the second cord gripping member containing a vertical panel and a horizontal panel, the horizontal panel of the second cord gripping member containing an arcuate shaped cutout, the vertical panel of the second cord gripping member containing an indent; and an electric wire holder.

These and other features, aspects and advantages of the present invention will become better understood with reference to the following drawings, description and claims.

BRIEF DESCRIPTION OF THE DRAWINGS

FIG. 2 is a rear view of the insulator fastened to a pole according to an embodiment of the present invention;

FIG. 3 is a top view of the insulator fastened to a pole according to an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Electric fences are configured to keep domestic animals in certain confined areas as well as keep wild animals from entering these areas. The fences comprise electrified wired that surround these areas. In order to keep the wires elevated above ground, the wires must be supported in a way that they do not make contact with materials that conduct electricity including the posts and trees, which would cause the electrical current to be lost to the ground. In order to solve the problem, insulators that hold the electric wires are placed between the electric wires and the posts and trees.

Numerous types of electric fence post insulator types and holders are known to support a wire in an electric fence. However, these prior insulator holders when fastened to trees create tree wounds and leave behind hardware such as nails or wire embedded in the tree as the tree grows. Additionally, these wire or nail fasteners may become dislodged or lost and become a source of hardware disease in livestock. It is further desirable that the insulator have a shape that reduces the contact area with the tree in order to minimize any possible damage to the tree. The attachment to the tree must be stable and secure and allow for tree growth as well as easy adjustment and removal of the insulator assembly.

The object of this invention is to provide an elastic electric fence insulator assembly fastener that stretches as the tree grows allowing electric fence attachment to trees without injuring the tree or having the risk of hardware damage to the tree or livestock. Another object of this invention is to provide an electric fence post insulator fastener which is adaptable to different sizes, shapes and materials and can be used to fasten electric fence insulators to fence posts, poles or fence post, pole and tree combinations. Yet another object of this invention is to provide an electric insulator holder structure which is constructed to have the insulator easily removed, adjusted or replaced.

The present invention is illustrated in FIGS. 1-20. FIGS. 1-11 portray attachment embodiments of the insulator 10 to a pole, t-post and tree. The parts, components and features of the insulator 10 are depicted in FIGS. 12-20 shown from various angles. The insulator comprises three major components:

1. The electric wire holder having a first part 28 and a second part 29. The function of the electric wire holder is to keep the wire 15 in place and away from the conductive materials onto which the insulator 10 is fastened onto.

Figure 10:
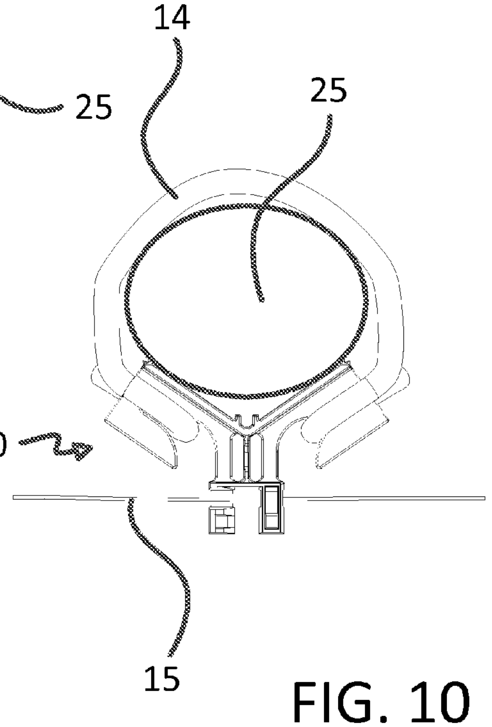
FIG. 10 is a top view of the insulator fastened to a standard shape tree according to an embodiment of the present invention.
Figure 9:
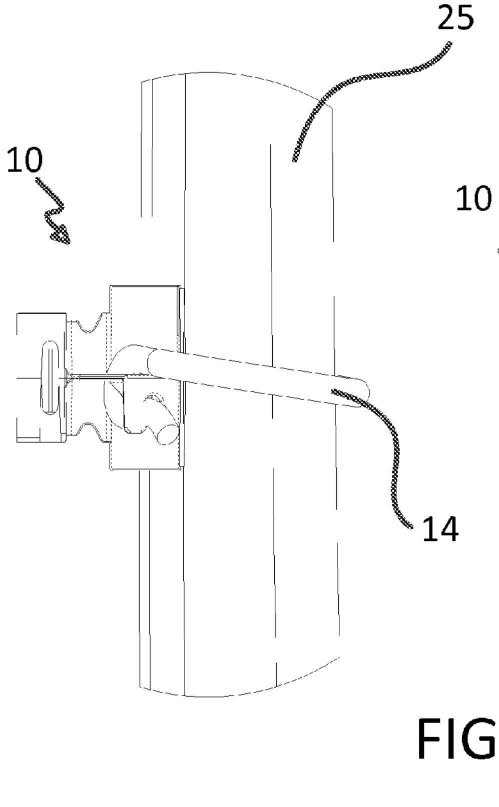
FIG. 9 is a side close-up view of the insulator fastened to a tree according to an embodiment of the present invention.
Figure 10A:
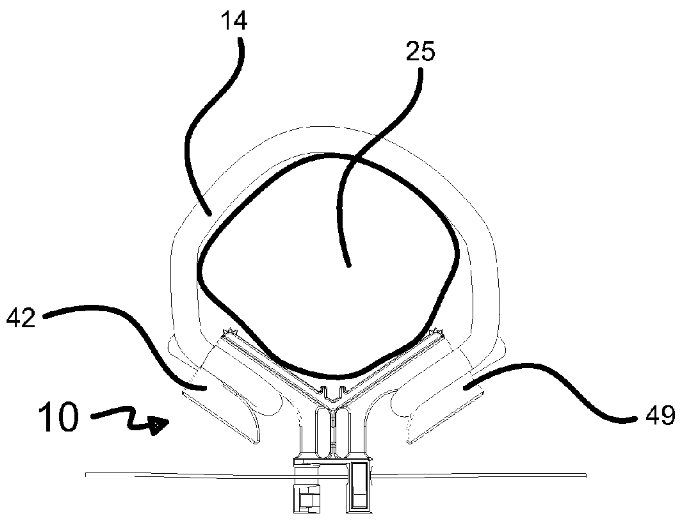
FIG. 10A is a top view of the insulator fastened to an irregular shape tree according to an embodiment of the present invention.
Figure 12:
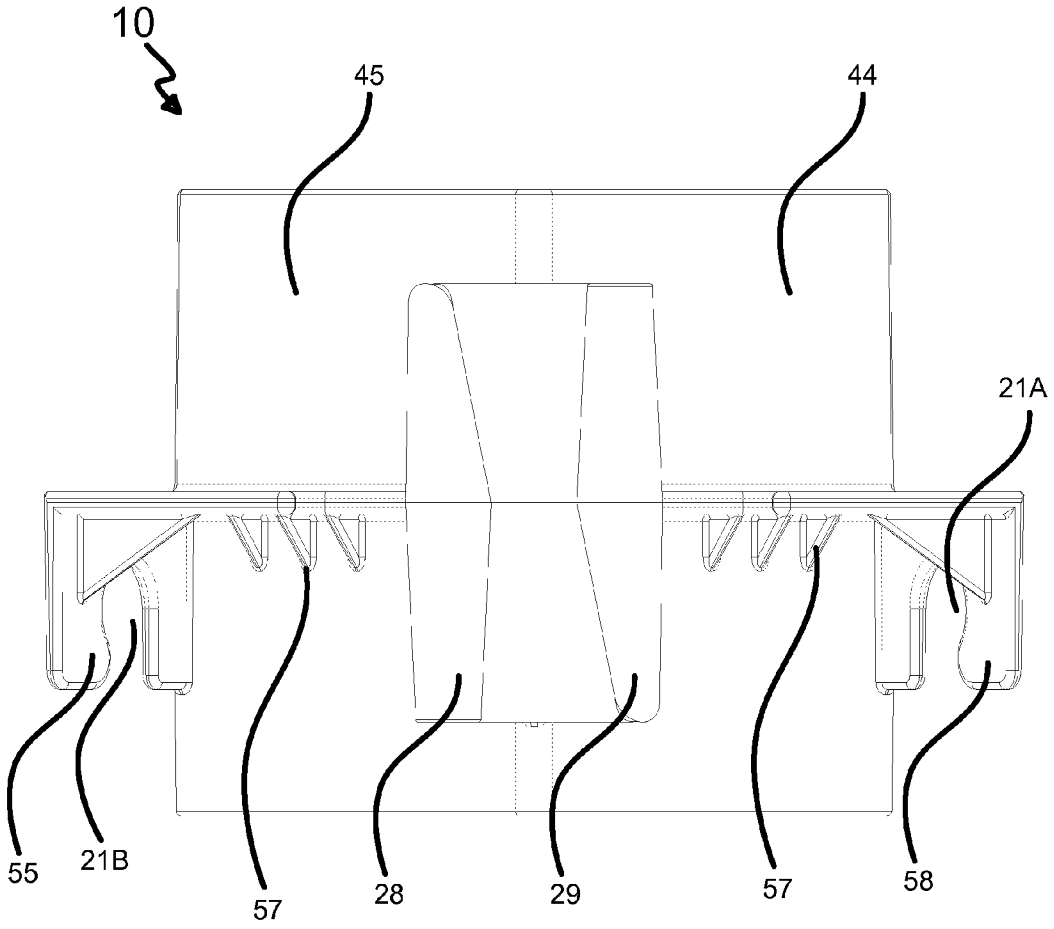
FIG. 12 is a rear view of the electric fence insulator assembly according to an embodiment of the present invention.
Figure 13:
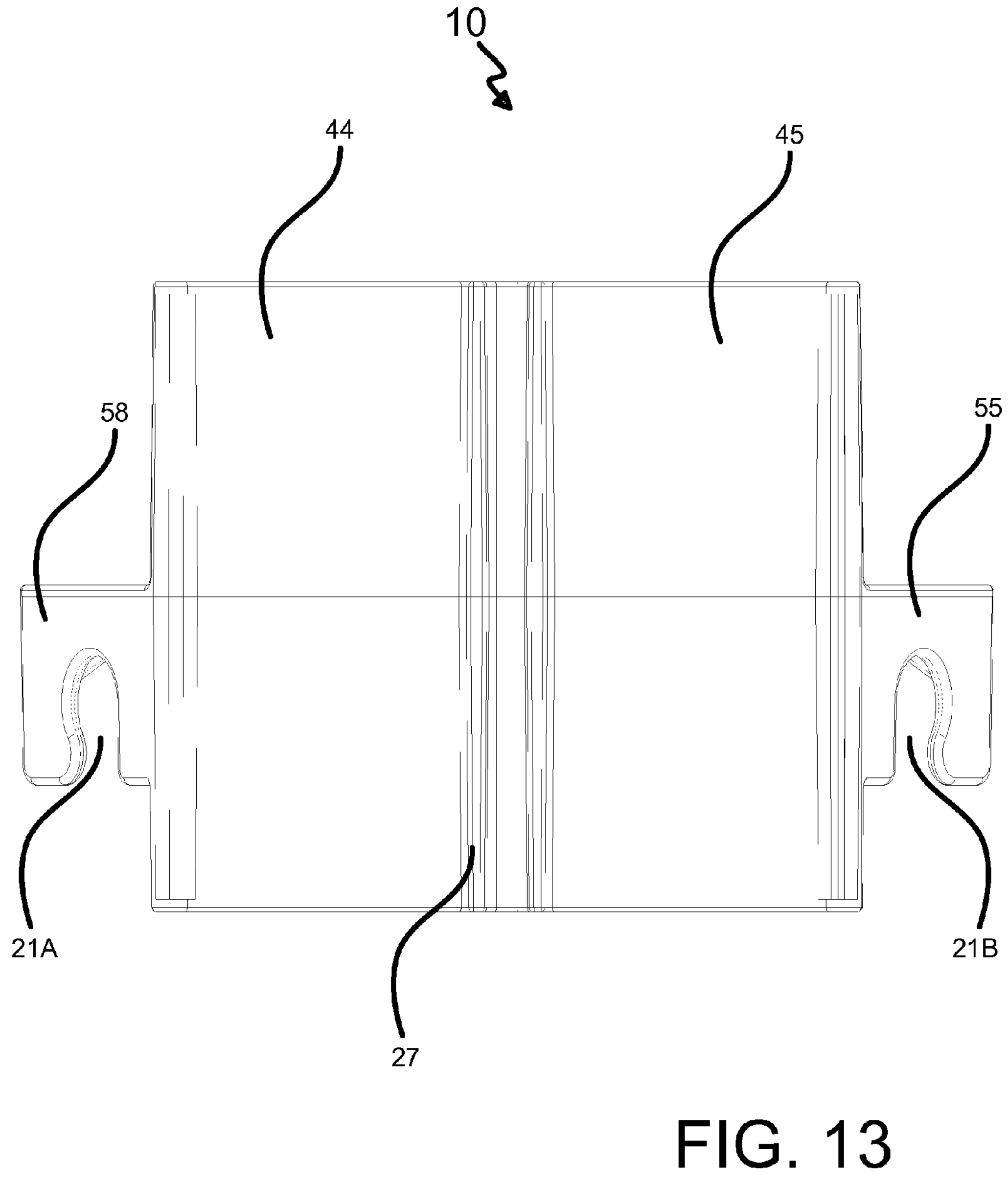
FIG. 13 is a front view of the electric fence insulator assembly according to an embodiment of the present invention.

2. An attaching support system comprising of a first angled support panel 44, a second angled support panel 45 and a clamp 27. Connecting member 71 bridges between the panels. The support panels 44 and 45 are used for attaching the insulator 10 to round objects such as poles or pipes 11 and trees 25, while the clamp 27 is used to fasten onto the back rib 43 of t-post 22 in conjunction with cord 14 placed between front ribs 23 of the t-post. The insulator of the present invention is designed to be versatile so that it may be attached to standard shaped trees as well as irregular shaped trees as shown in FIGS. 10 and 10A. The clamp configured for attaching onto t-posts is disposed on the front side of connecting member 71.

Figure 1:
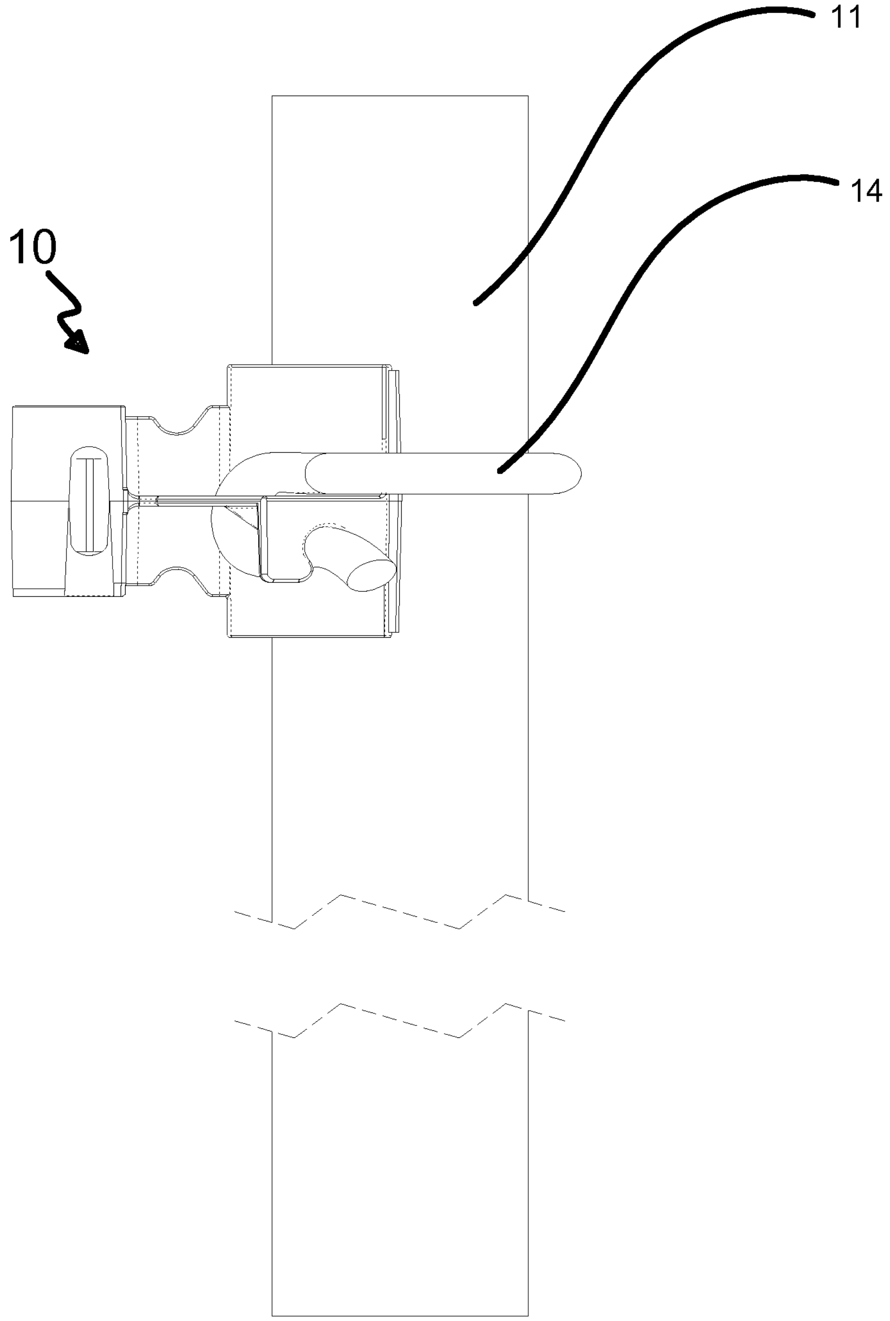
FIG. 1 is a side view of the insulator fastened to a pole according to an embodiment of the present invention.
Figure 4:
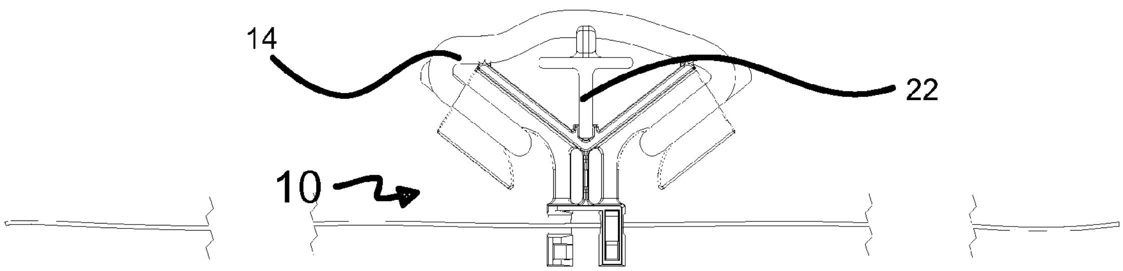
FIG. 4 is a top view of the insulator fastened to a t-post according to an embodiment of the present invention.

3. The cords are held by two cord gripping members each having a horizontal panel and a vertical panel. The first cord gripping member contains 1st horizontal panel 49 and 1st vertical member 58 while the second cord gripping member contains 2nd horizontal panel 42 and 2nd vertical member 55. The cord 14 is wedged into openings 47A and 21B respectively in the horizontal and vertical panels 49, 58 of the first gripping member and 47B and 21A respectively in the horizontal and vertical panels 42, 55 of the second gripping member as shown in FIGS. 12-18. Openings 47 are arcuate shaped cutouts in the horizontal panels while openings 21 are indents in the vertical panels. The cord 14 is preferably made of stretchable material that is pulled tightly and securely wedged into the openings 47 and 21 that hold the cord 14 at about a 90 degree angle. For t-posts 22, a clamp 27 is used to contain and fasten onto the back of the t-post 22 as shown in FIG. 4.

Figure 5:
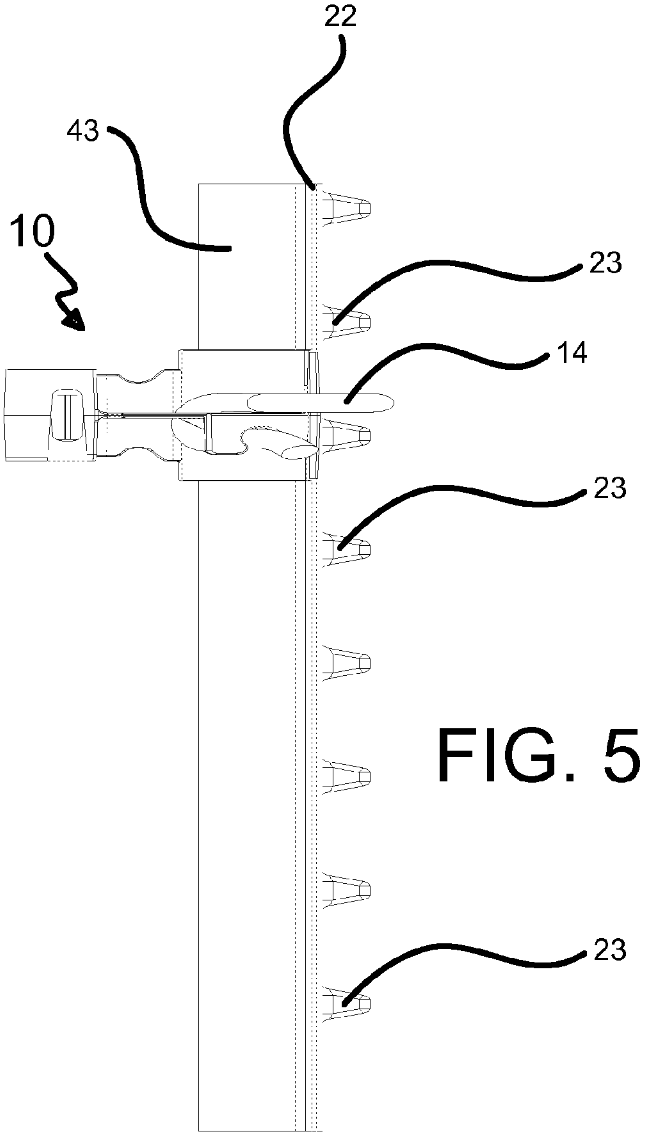
FIG. 5 is a side view of the insulator fastened to a t-post according to an embodiment of the present invention.
Figure 6:
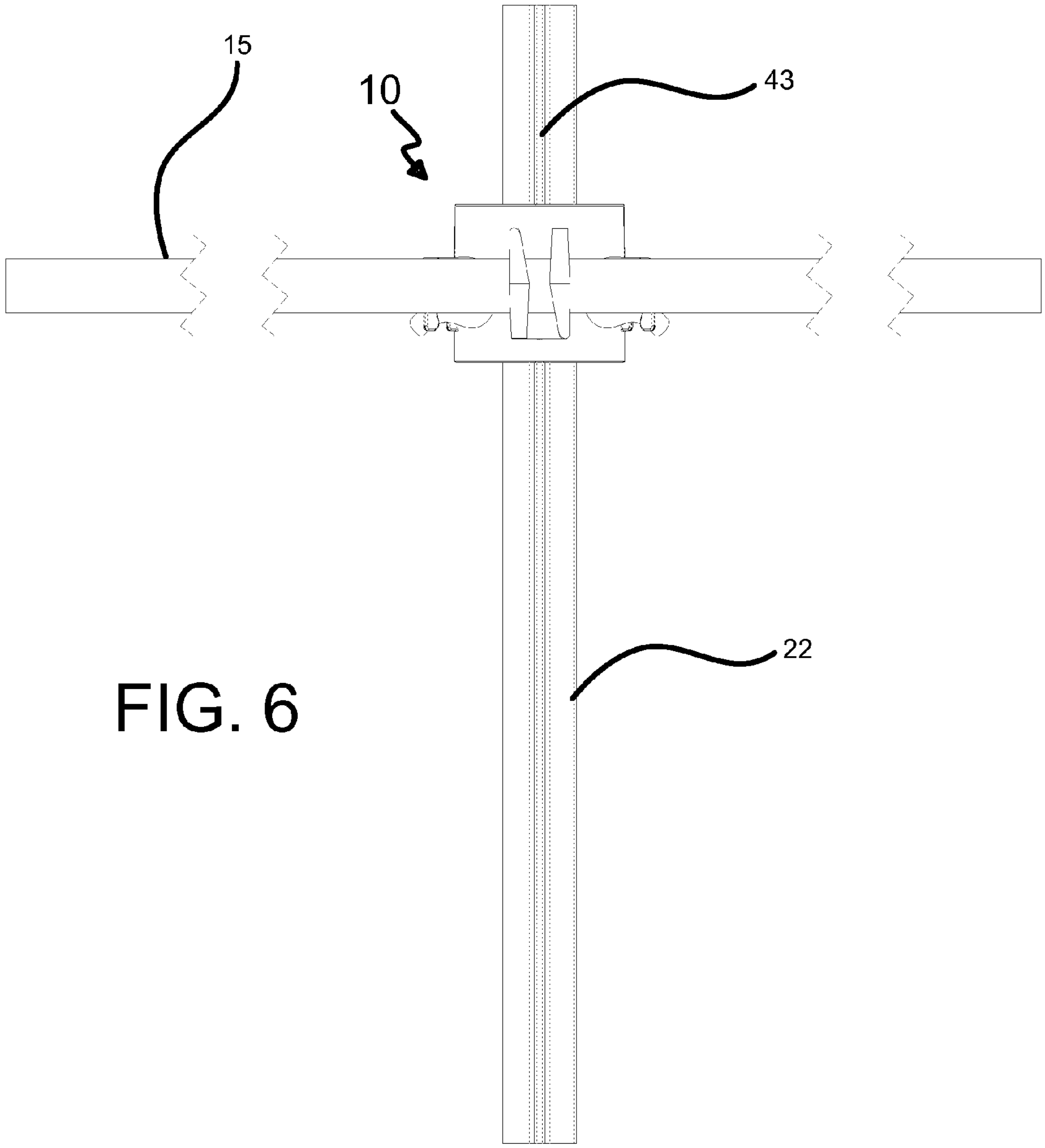
FIG. 6 is a rear view of the insulator fastened to a t-post according to an embodiment of the present invention.
Figure 7:
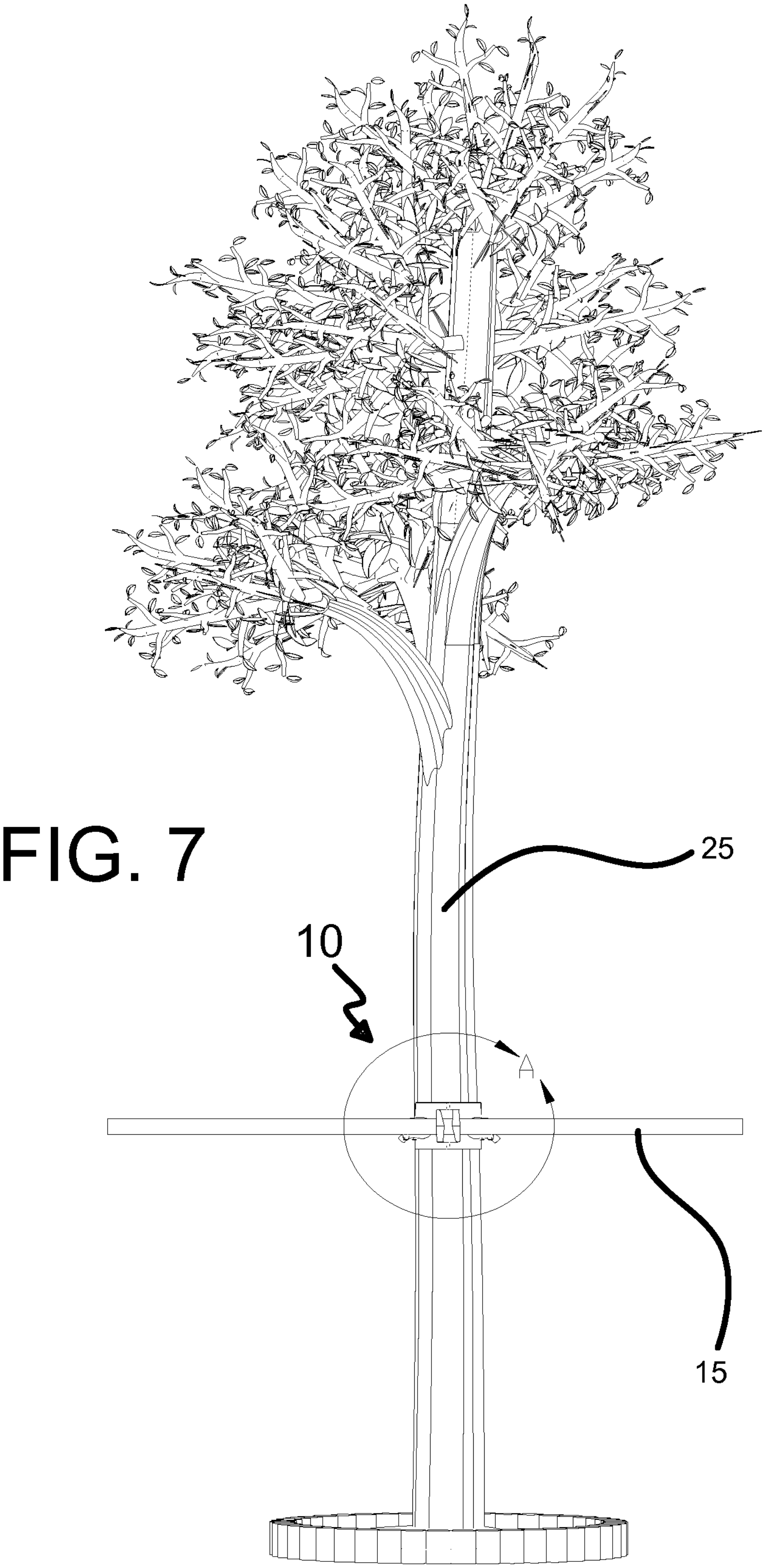
FIG. 7 is a rear view of the insulator fastened to a tree according to an embodiment of the present invention.
Figure 8:
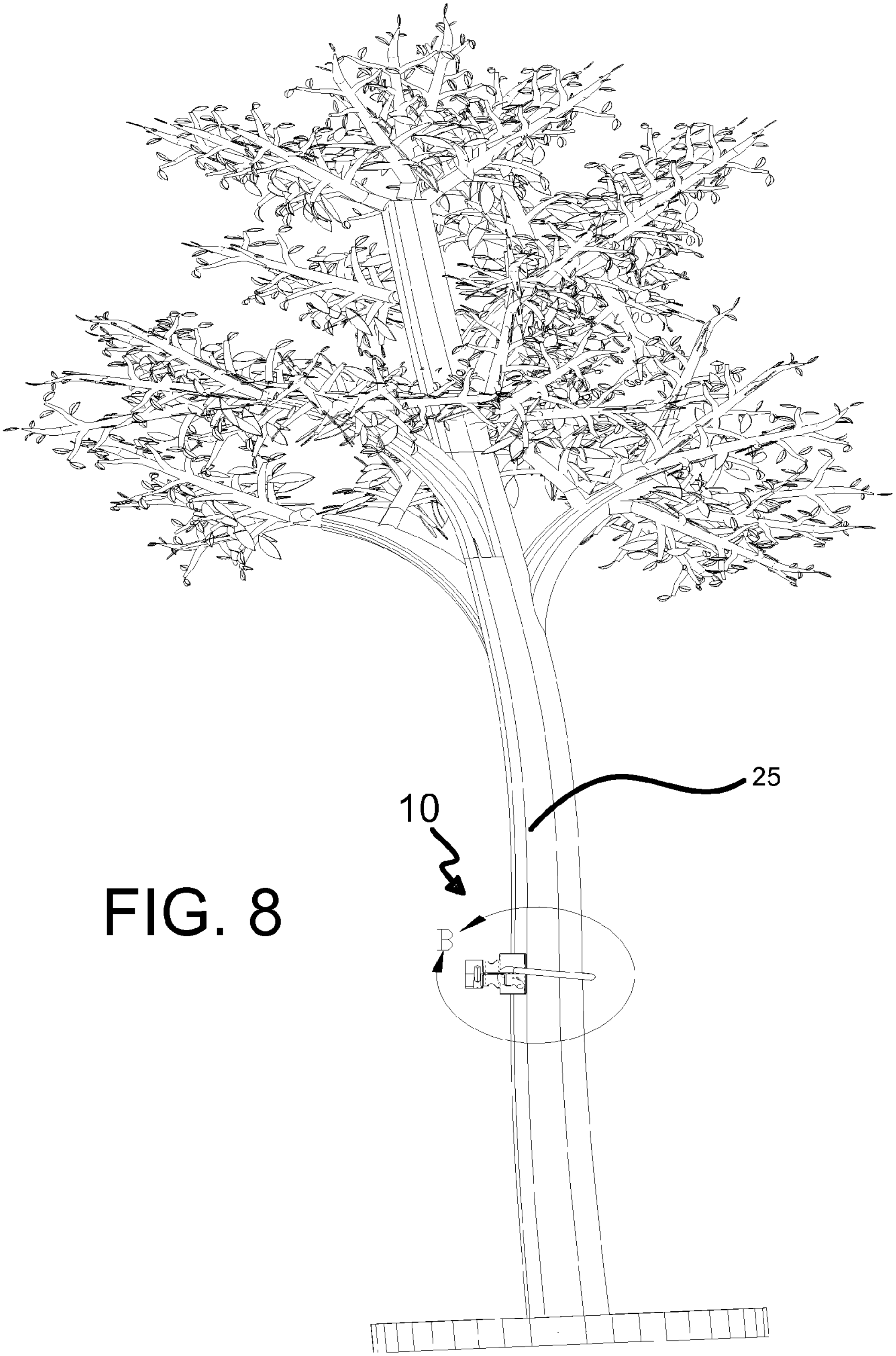
FIG. 8 is a side view of the insulator fastened to a tree according to an embodiment of the present invention.
Figure 11:
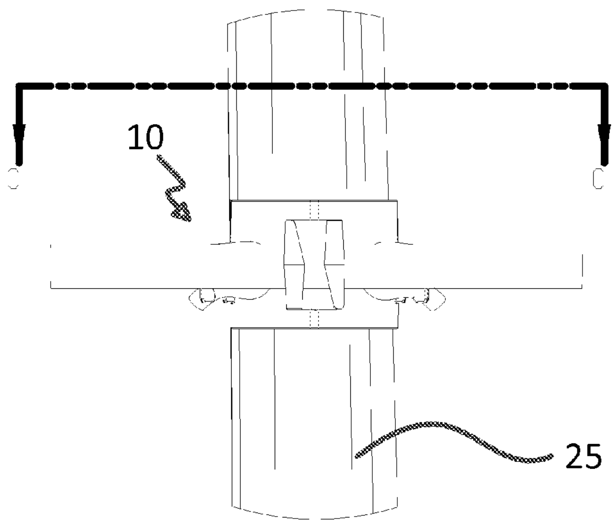
FIG. 11 is a rear close-up view of the insulator fastened to a tree according to an embodiment of the present invention.
Figure 14:
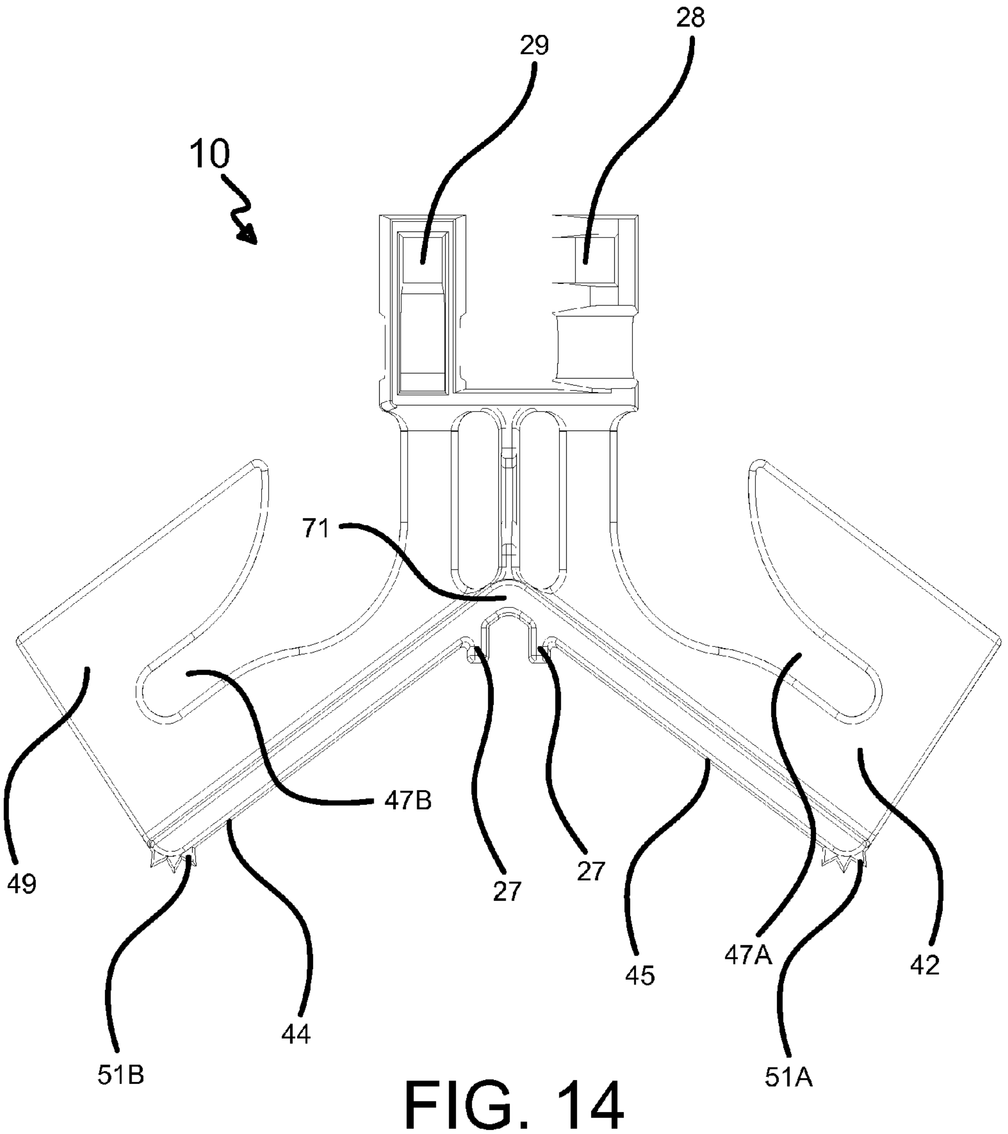
FIG. 14 is a top view of the electric fence insulator assembly according to an embodiment of the present invention.
Figure 15:
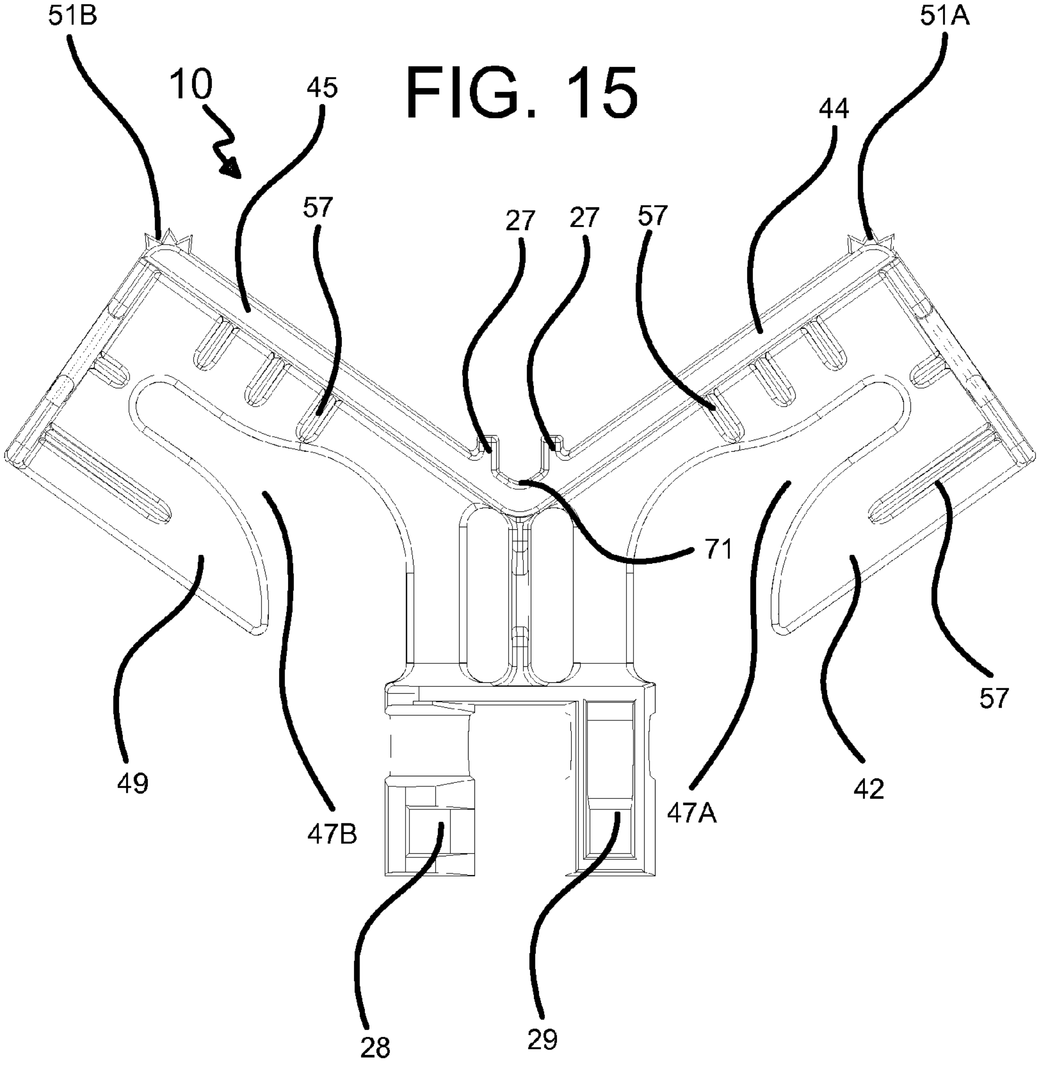
FIG. 15 is a bottom view of the electric fence insulator assembly according to an embodiment of the present invention.
Figure 16:
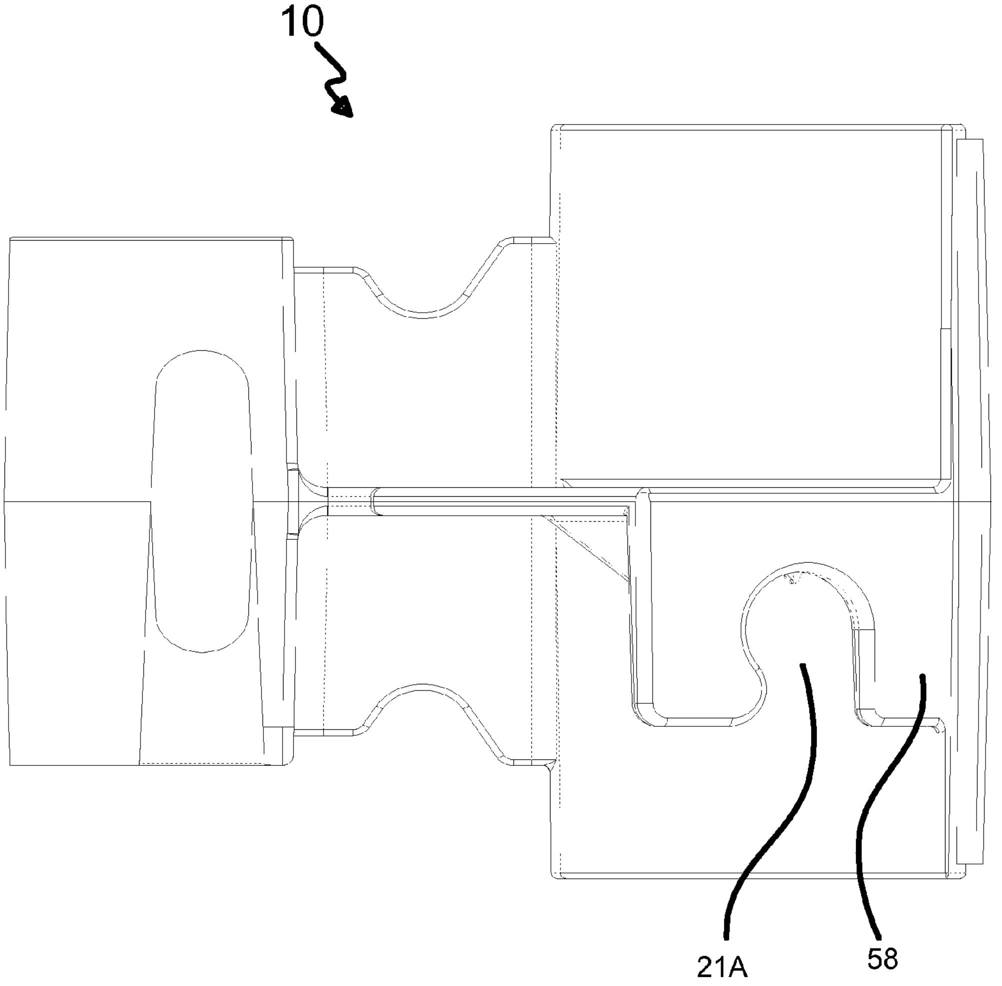
FIG. 16 is a side view of the electric fence insulator assembly according to an embodiment of the present invention.
Figure 17:
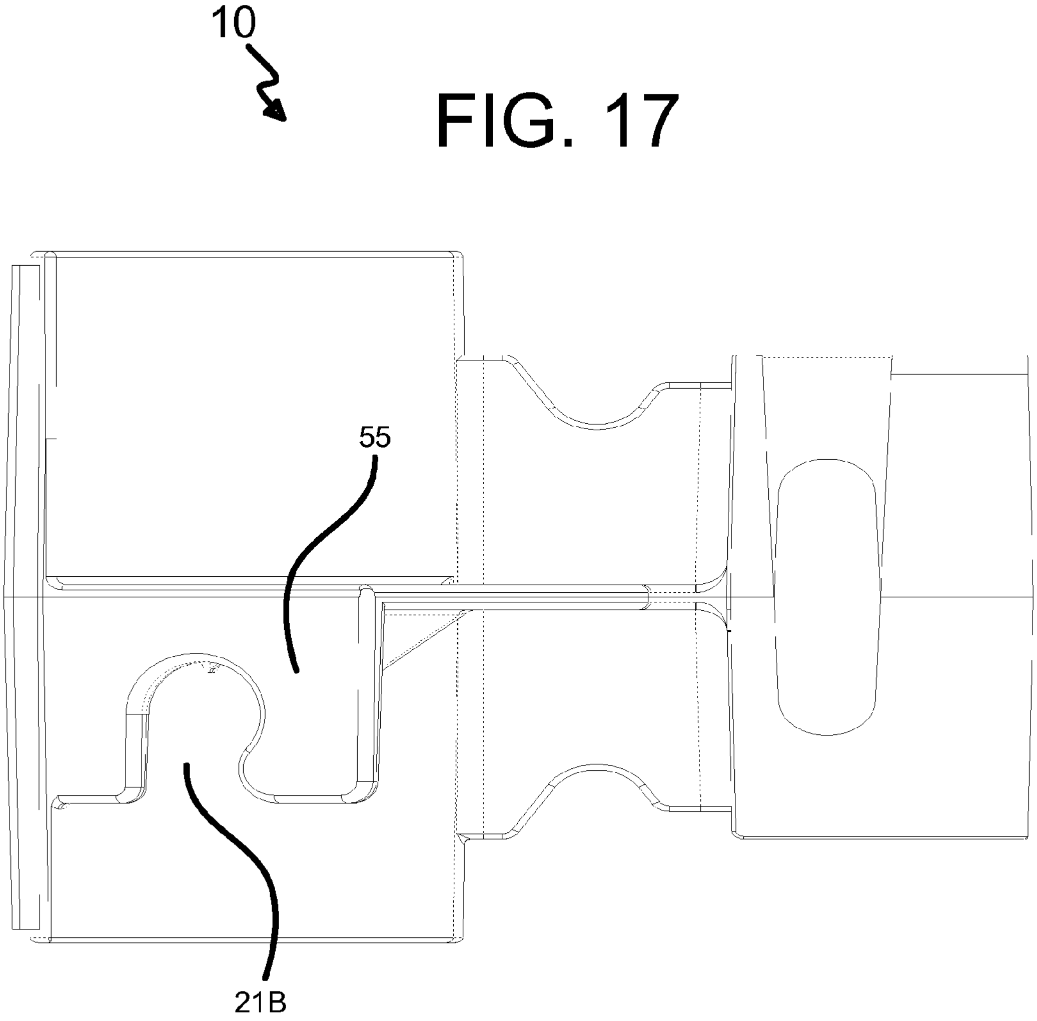
FIG. 17 is another side view of the electric fence insulator assembly according to an embodiment of the present invention.
Figure 18:
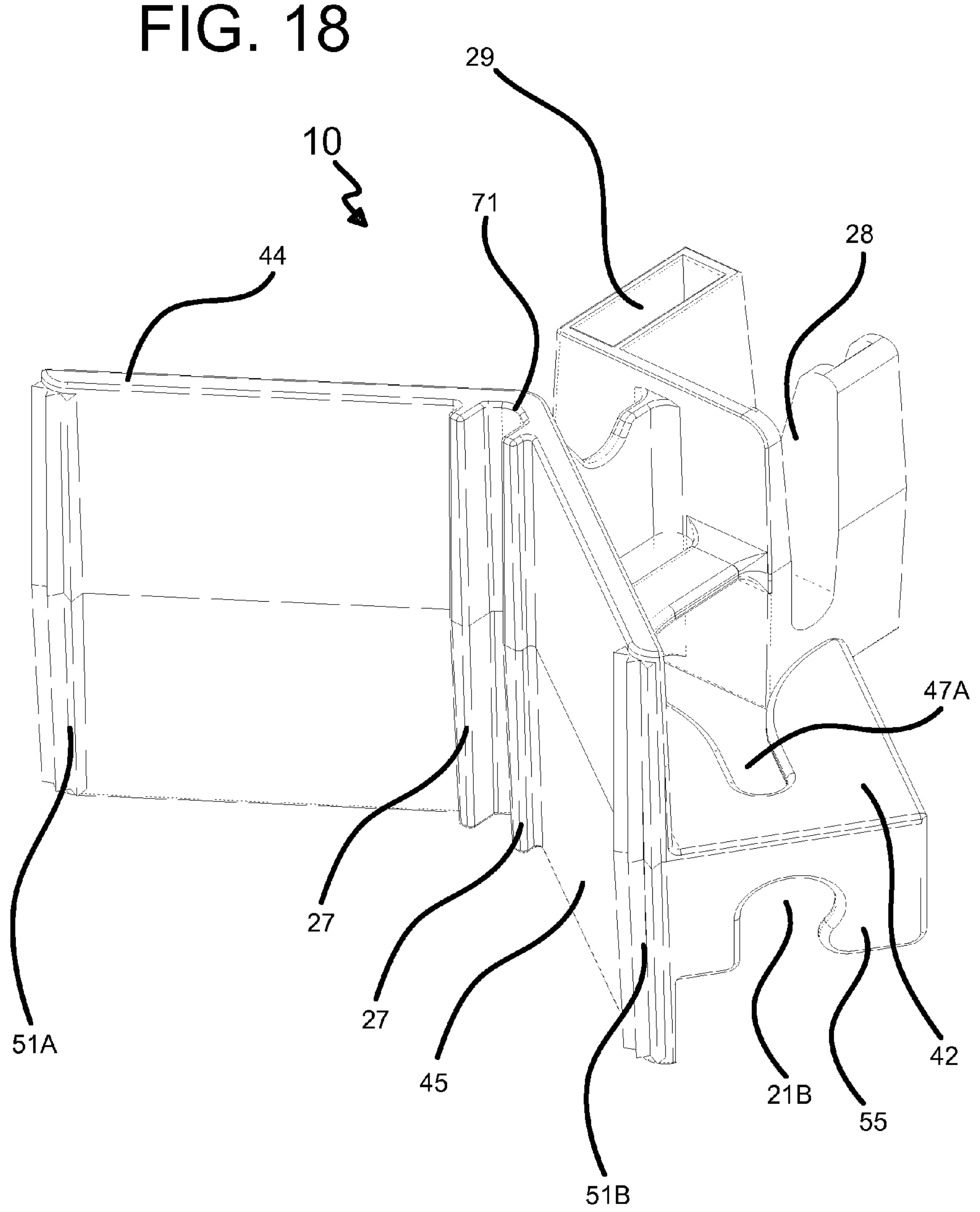
FIG. 18 provides a perspective view of the electric fence insulator assembly according to an embodiment of the present invention.
Figure 19:
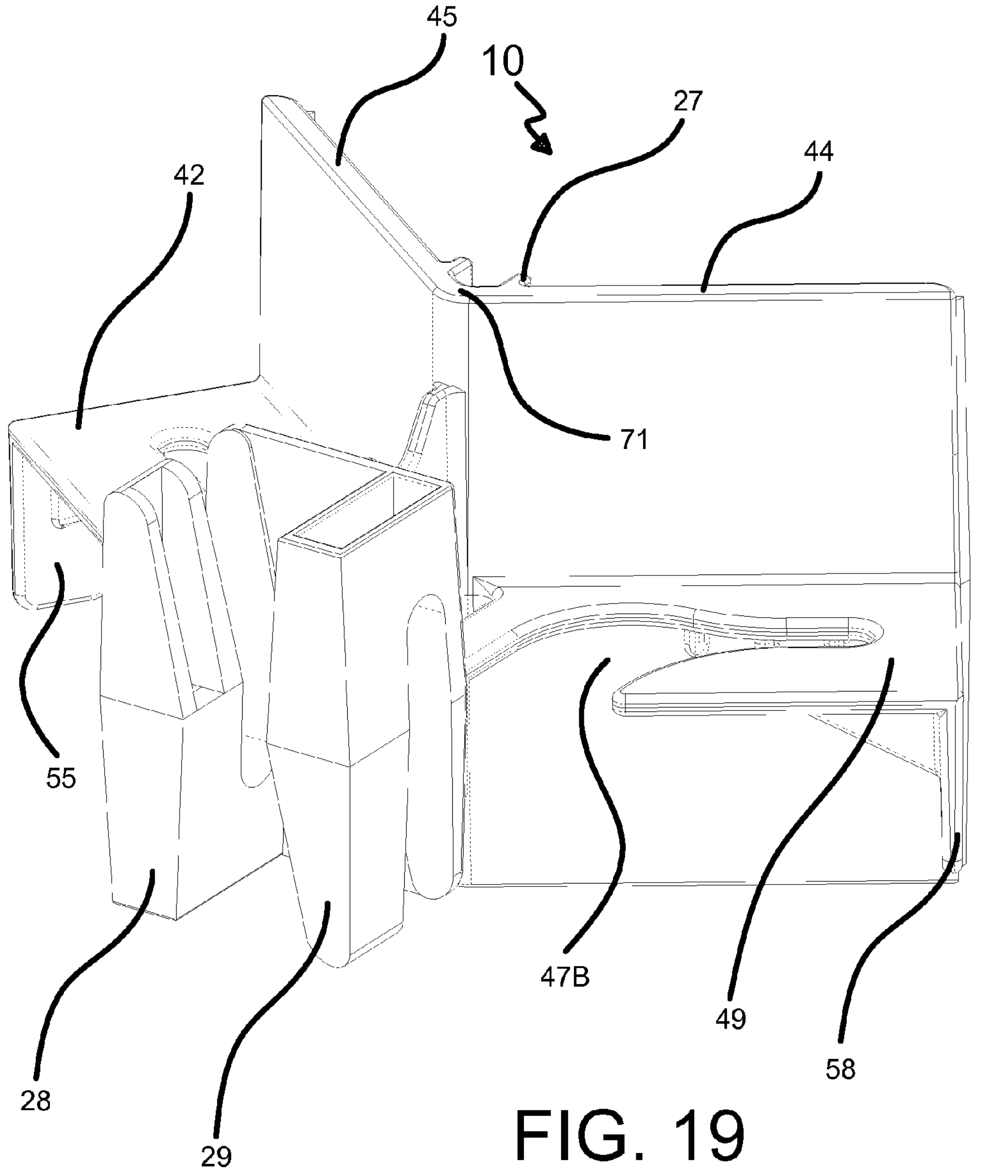
FIG. 19 provides another perspective view of the electric fence insulator assembly according to an embodiment of the present invention.

Additionally, t-posts 22 may contain front ribs 23 and a rear rib 43 as shown in FIG. 5. The ends of panels 44 and 45 may contain stabilizing fins 51A and 51B for firming up the insulator attachment to the tree and prevent slippage as shown in FIG. 14. The insulator 10 may also contain gussets 57 to strengthen the rubber cord hold and add structural support to the insulator.

The present invention electric fence insulator assembly attempts to minimize the surface area that the panels and the cord come in contact with as the insulator assembly is tied to the tree trunk. This may be accomplished by the following:

1. Optimizing the angle between the angled panels. The angle between the panels may be adjustable by placing a hinge inside the connecting member 71 or making the connecting member from a flexible plastic. The adjustability feature allows the insulator to better conform to variety of sizes and shapes of tree trunks.

2. Configuring the distance of the cord gripping members such that the cord is gripped at an angle that takes the cord away from the tree. This is illustrated in FIGS. 10 and 10A that show that the cord does not make contact with the portion of the trunk surface around the ends of each panel as the cord wraps around the tree trunk.

3. Using a meshed netting cord.

Tree trunks vary in size and shape. Generally, for a small and round tree, the panel contact area tends to be large while the cord contact area tends to be small as may be seen in FIG. 3. For larger and irregular shaped trees, the contact area of the panel with the tree trunk tends to be small while the cord tends to cover a larger area.

Figure 20:
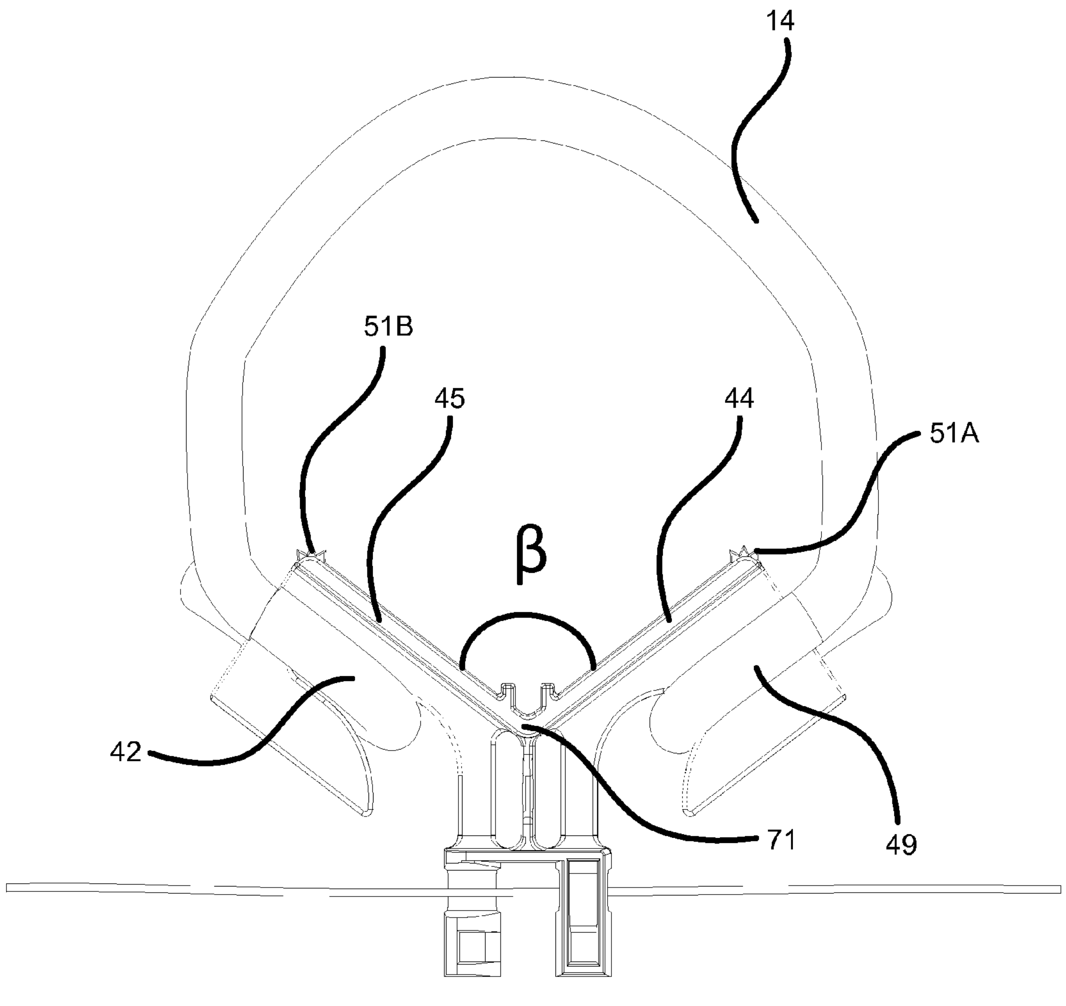
FIG. 20 is another top view of the electric fence insulator assembly according to an embodiment of the present invention.

The preferred angle β between the first angled support panel 44 and the second angled support panels 45 is in the range between about 110 degrees and about 130 degrees as shown in FIG. 20. In this angle design range, the insulator provides the most versatile fit to tightly attach onto pipes, posts and various tree sizes and shapes.

The electric fence insulator assembly cord may be made of a variety of elastic, rubber or bungee materials. They preferred thickness is 3/8"; however other sizes also fall within the scope of the present invention.

It should be understood, of course, that the foregoing relates to exemplary embodiments of the invention and that modifications may be made without departing from the spirit and scope of the invention.

I claim:

1. An electric fence insulator assembly configured for securely attaching to materials and surfaces of trees, coral panels and posts, said electric fence insulator assembly comprising:

a first lateral panel having an inner end and an outer end and a second lateral panel having an inner end and an outer end, said first panel inner end being attached to a first side of a connecting member, said second panel inner end being attached to a second side of the connecting member;

a first cord gripping member attached to a rear side of the first lateral panel, said first cord gripping member containing a vertical panel and a horizontal panel, said horizontal panel of the first cord gripping member containing an arcuate shaped cutout, said cutout narrowing from an inner portion of the horizontal panel to an outer portion of the horizontal panel of the first cord gripping member, said vertical panel of the first cord gripping member containing an indent;

a second cord gripping member attached to a rear side of the second lateral panel, said second cord gripping member containing a vertical panel and a horizontal panel, said horizontal panel of the second cord gripping member containing an arcuate shaped cutout, said cutout narrowing from an inner portion of the horizontal panel to an outer portion of the horizontal panel of the second cord gripping member, said vertical panel of the second cord gripping member containing an indent; and an electric wire holder attached to a rear portion of the connecting member.

2. The electric fence insulator assembly of claim 1 further comprising a clamp attached to a front side of said connecting member.

3. The electric fence insulator assembly of claim 2 wherein the clamp is configured to fasten onto a rear t-post rib.

4. The electric fence insulator assembly of claim 1 wherein an angle between the first lateral panel and the second lateral panel ranges between about 110 degree and about 130 degrees.

5. The electric fence insulator assembly of claim 1 further comprising a cord wrapped around a support stand wherein a first end portion of the cord is wedged in the angled channel of the horizontal panel of the first cord gripping member and a second end portion of the cord is wedged in the angled channel of the horizontal panel of the second cord gripping member.

6. The electric fence insulator assembly of claim 5, wherein the support stand is a tree and wherein the electric fence insulator assembly is attached to the tree in a manner such as the tree trunk is wedged between the first lateral panel and the second lateral panel.

7. The electric fence insulator assembly of claim 5, wherein the support stand is a t-post.

8. The electric fence insulator assembly of claim 4 wherein the angle is adjustable between about 110 degrees and about 130 degrees.

9. The electric fence insulator assembly of claim 1 further comprising fins attached to the outer end of the first lateral panel and the outer end of the second lateral panel for reducing the likelihood of slippage of the electric fence insulator assembly off the tree trunk.

10. The electric fence insulator assembly of claim 1 further comprising reinforcing gussets disposed unto a bottom surface of the horizontal panel of the first cord gripping member and a bottom surface of the horizontal panel of the second cord gripping member.

11. The electric fence insulator assembly of claim 5, wherein the first end potion of the cord is further wedged in the indent of the vertical member of the first cord gripping member and the second end portion of the cord is further wedged in the indent of the vertical member of the second cord gripping member.

12. The electric fence insulator assembly of claim 5, wherein the cord is made of stretchable meshed netting.

* * * * *